United States Patent [19]

Storey et al.

[11] 4,364,087
[45] Dec. 14, 1982

[54] MOVEMENT DETECTOR FOR TELEVISION SIGNALS

[75] Inventors: Richard Storey, Sutton; Alan Roberts, Tadworth, both of England

[73] Assignee: British Broadcasting Corporation, London, England

[21] Appl. No.: 174,426

[22] Filed: Aug. 1, 1980

[30] Foreign Application Priority Data

Aug. 1, 1979 [GB] United Kingdom ................ 7926778

[51] Int. Cl.³ ............................................. H04N 7/18
[52] U.S. Cl. .................................... 358/105; 340/583
[58] Field of Search ................ 358/105, 93, 106, 139; 340/258

[56] References Cited

U.S. PATENT DOCUMENTS

| 3,781,468 | 12/1973 | Chomet et al. | 358/105 |
| 3,790,706 | 2/1974 | Gubala et al. | 358/280 |
| 4,112,463 | 9/1978 | Kamin | 358/105 |
| 4,148,062 | 4/1979 | Kamin | 358/105 |
| 4,160,998 | 7/1979 | Kamin | 358/105 |
| 4,236,180 | 11/1980 | Cayzac | 358/108 |

FOREIGN PATENT DOCUMENTS

| 1336498 | 11/1973 | United Kingdom | 358/105 |
| 2045574 | 10/1980 | United Kingdom | 358/105 |

OTHER PUBLICATIONS

D. L. Pearson et al., "A Simple Motion Detector for Television Signals" 1-73, Journal of the SMPTE vol. 82, pp. 17-21.

*Primary Examiner*—Robert L. Griffin
*Assistant Examiner*—Edward L. Coles
*Attorney, Agent, or Firm*—Robert F. O'Connell

[57] ABSTRACT

A movement detector for television signals measures the difference between maximum and minimum values of the movement components of a picture difference signal over a chosen interval. A television signal at an input (12) is delayed in a picture delay (2), and the delayed and undelayed signals subtracted in a subtractor (1) to form a picture difference signal. This is rectified in rectifier (3) and smoothed in a filter (4). A maximum detector (6) and a minimum detector (7) are coupled to the filter output and are re-set at prescribed intervals. A subtractor (8) determines the difference between the output of detectors (6) and (7) and this is compared with a reference value in a comparator (9), the output of which is sampled and stored in a store (10).

7 Claims, 2 Drawing Figures

GENERAL REALISATION OF THE
MOVEMENT DETECTOR

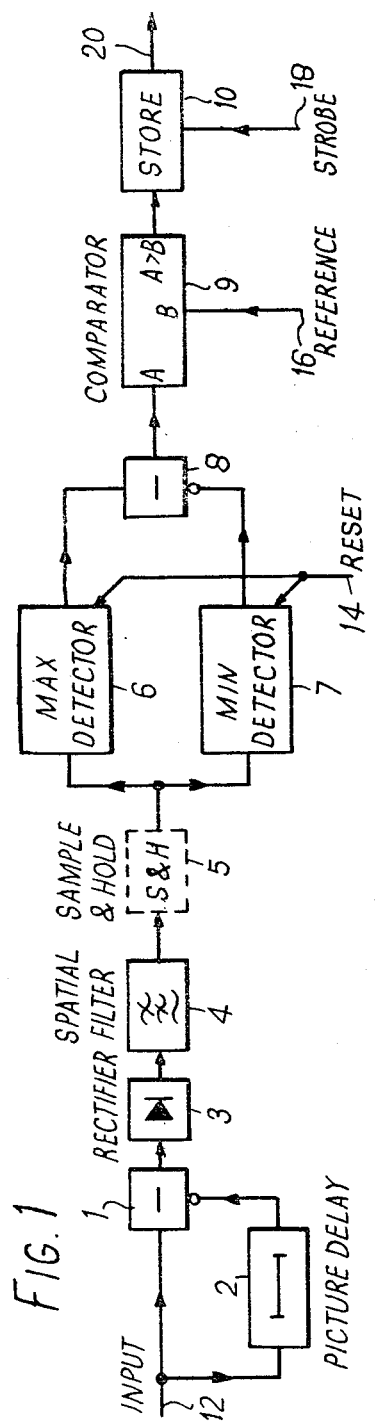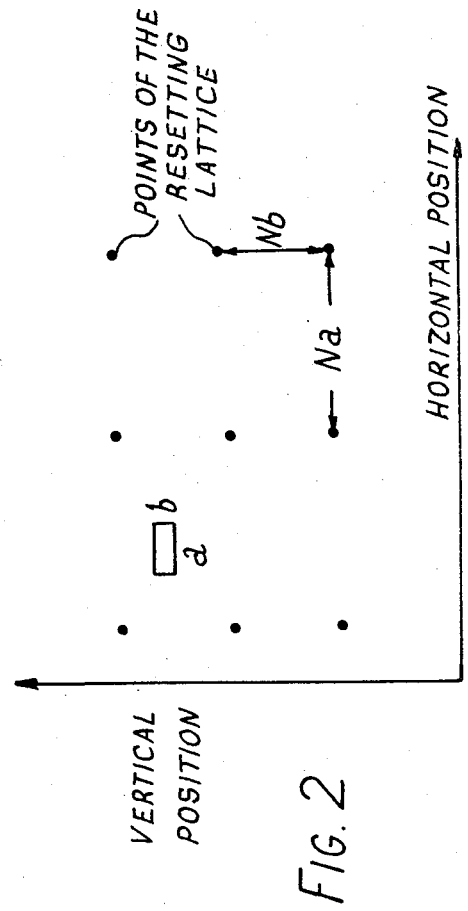

MOVEMENT DETECTOR FOR TELEVISION SIGNALS

BACKGROUND OF THE INVENTION

This invention relates to a movement detector for television signals.

By "movement" is meant a change in scene content, as opposed to noise, or a change inherent in the format of the television signal.

DESCRIPTION OF THE INVENTION

The invention will be described by way of example with reference to the drawings, in which:

FIG. 1 is a block circuit diagram of a movement detector embodying the invention; and FIG. 2 is a diagram illustrating the resetting of a rectangular spatial filter in the circuit of FIG. 1.

The movement detector illustrated in FIG. 1 is designed for use on any television signal, whether sequential or interlace scanned, but which contains no colour information that changes from field to field in a stationary picture.

This movement detector detects motion by measuring the difference between maximum and minimum values of the movement components of a picture difference signal over a chosen interval. This approach works because it is improbable that all parts of a scene will move at precisely the same speed or have the same 'contrast' Movement will therefore cause a large difference between maximum and minimum values.

Referring to FIG. 1, the circuit has an input 12 to which is connected the non-inversion input of a subtractor 1 and a one-picture delay 2. The output of delay 2 is connected to the inversion input of subtractor 1. A rectifier 3 is connected to the output of the subtractor 1, and a spatial or two-dimensional filter 4 is connected to the output of the rectifier 3. A sample-and-hold circuit 5 may be connected to the output of filter 4 as described below. In any event, the filter output is applied both to a maximum detector 6 and a minimum detector 7 which can be reset by a signal at an input 14. A subtractor 8 has its two inputs connected respectively to the outputs of the detectors 6 and 7, and applies its output to a comparator 9 which compares the subtractor output with a reference value received at an input 16. The comparator output is applied to a store 10 which can be strobed by a signal at an input 18 to provide an output signal at an output 20.

The circuit operates as follows. A smoothed rectified picture difference signal is formed using subtractor 1, delay 2, rectifier 3 and filter 4. This signal is then fed to the maximum and minimum detectors 6 and 7 which are reset at prescribed intervals. Subtractor 8 forms the difference between these two values and this difference is compared with a reference value in comparator 9, the output of which is sampled and stored at the same intervals in the store 10. The purpose of the spatial filter is to reduce the variance of the rectified picture difference signal caused by noise alone to the point where it contributes very little to the difference between maximum and minimum values during a stationary picture.

The minimum value represents the noise level and some function of the speed of motion and 'contrast' of the slowest moving and/or lowest contrast moving areas. The maximum value represents the noise level and some function of the speed of motion and 'contrast' of the fastest moving and/or highest contrast moving areas. The difference signal appearing at the output of subtractor 8 thus contains information about movement but very little information about noise (assuming a large aperture spatial filter). The comparator 9 and its associated reference allow the effects of any remaining noise contributions to the subtractor output to be removed from the movement decision. The reference value can also be used to adjust the sensitivity of the movement detector.

Thus the detector illustrated can be made almost independent of picture noise level, that is, it works equally well for signals with low or high noise without the need for compensating adjustments.

The maximum and minimum values are found during a preselected interval, and no indication of where or how much movement has occurred within this interval can be given. The detector is therefore particularly applicable to detect "global motion" over the whole scene or at least a substantial part of it. As a global motion detector it can be used in the circuits described in our cognate U.K. Patent Applications Nos. 9537/77 and 12972/78 (see German Offenlegungsschrift No. 28 09 216 and European Patent Application No. 79 300450.8, publication No. 4728) where its insensitivity to picture noise is an advantage and its inability to localise a movement decision does not matter.

The area of the spatial filter aperture governs the movement detector's immunity to noise, a larger aperture giving more immunity. The shape of the spatial filter characteristic, however, dictates how often the maximum and minimum detectors can be reset, and hence controls the degree of localisation of movement decisions. The spacing between the points at which the maximum and minimum detectors can be reset must be several (N) spatial filter apertures for the decisions to be meaningful (see FIG. 2). A movement detector having a rectangular spatial filter can therefore localise movement decisions to the rectangles formed by the lattice of its resetting points. The degree of localisation for pure horizontal and pure vertical filters can be found by making b equal to one television line and a equal to one horizontal picture element respectively.

A particular realisation, preferred for its instrumental simplicity, used an integrator as a spatial filter whose output is sampled by a sample and hold circuit 5 and reset to zero once per television line. This constitutes a pure horizontal filter with an aperture of 1 picture width. The sampled values therefore indicate the mean picture difference for each line. The resetting interval is chosen as once per field since the 'global motion detector' application requires localisation only to an accuracy of 1 field period. As mentioned previously, the difference between maximum and minimum values is compared with a reference which sets the sensitivity. The movement decision is stored in the store 10 which is strobed once per field immediately before the maximum and minimum detectors are reset. This realisation gives good immunity to noise and performs well as a global motion detector.

We claim:

1. A movement detector for detecting movement in selected picture areas of a video signal, comprising:
   an input for receiving an input video signal;
   difference signal generating means connected to the input for generating a signal representative of the difference between the input signal on two different field scans;

extreme value determining means for determining for a selected area or areas of the picture maximum and minimum values of the difference signal; and comparing means for comparing the value of said maximum value minus said minimum value with a reference value.

2. A movement detector according to claim 1, in which the difference signal generating means comprises a picture delay connected to the input and a combining circuit for determining the difference between the input signal and the picture-delayed signal.

3. A movement detector according to claim 1 or 2, including a two-dimensional (vertical, and horizontal/time) filter connected between the difference signal generating means and the extreme value determining means.

4. A movement detector according to claim 3, in which the filter comprises an integrator for providing an integration output, and a sample-and-hold circuit connected to the output of the integrator.

5. A movement detector according to claim 1, in which the extreme value determining means comprises a resettable maximum detector and a resettable minimum detector both connected to the output of the difference signal generating means.

6. A movement detector according to claim 5, in which the maximum and minimum detectors are reset at points which form a regular lattice on the picture.

7. A movement detector according to claim 1, in which the comparing means comprises a subtractor, and a comparator which is supplied with a reference value.

* * * * *